(12) United States Patent
Koshta et al.

(10) Patent No.: US 11,882,443 B2
(45) Date of Patent: Jan. 23, 2024

(54) TRACKING AREA IDENTIFIER (TAI) CHANGE DURING AUTHENTICATION REQUEST PROCESSING

(71) Applicant: APPLE INC., Cupertino, CA (US)

(72) Inventors: Nirlesh Koshta, Karnataka (IN); Krisztian Kiss, Cupertino, CA (US); Pradeep Pangi, Karnataka (IN); Sridhar Prakasam, Cupertino, CA (US); Vijay Venkataraman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 316 days.

(21) Appl. No.: 17/593,118

(22) PCT Filed: Apr. 5, 2021

(86) PCT No.: PCT/US2021/025798
§ 371 (c)(1),
(2) Date: Sep. 9, 2021

(87) PCT Pub. No.: WO2021/207084
PCT Pub. Date: Oct. 14, 2021

(65) Prior Publication Data
US 2022/0312198 A1 Sep. 29, 2022

(30) Foreign Application Priority Data
Apr. 7, 2020 (IN) .............................. 202041015353

(51) Int. Cl.
*H04W 12/06* (2021.01)
*H04W 4/029* (2018.01)
*H04W 12/63* (2021.01)
*H04W 12/041* (2021.01)
(Continued)

(52) U.S. Cl.
CPC ........... *H04W 12/06* (2013.01); *H04L 9/0869* (2013.01); *H04W 4/029* (2018.02);
(Continued)

(58) Field of Classification Search
CPC .... H04W 12/06; H04W 12/065; H04W 76/11
See application file for complete search history.

(56) References Cited

U.S. PATENT DOCUMENTS

2018/0324138 A1 * 11/2018 Das ................... H04W 36/0055

FOREIGN PATENT DOCUMENTS

| CN | 112788739 A | * | 5/2021 | ............ H04W 60/00 |
| EP | 1439668 A2 | * | 7/2004 | .......... H04W 72/005 |
| EP | 3554113 A1 | * | 10/2019 | ............... H04L 9/14 |

OTHER PUBLICATIONS

PCT/US2021/025798, International Search Report and Written Opinion, dated Jun. 29, 2021, 19 pages.
(Continued)

*Primary Examiner* — Kevin Kim
(74) *Attorney, Agent, or Firm* — Dorsey & Whitney LLP

(57) ABSTRACT

Methods, systems, and devices for wireless communications are described. A user equipment (UE) may receive a first authentication request in response to a first triggering request from the UE to a mobility management node of a first Tracking Area (TA) in which the UE is located. In some embodiments, the UE may prepare and store an authentication response according to the first authentication request. In response to determining that the UE has moved from the first TA to a second TA, the UE may abort a sending of the authentication response, and may send the stored authentication response according to the first authentication request to the mobility management node of the second TA in response to the receipt of the second authentication request and in further response to a determination that a given parameter of each of the first and second authentication requests are the same.

12 Claims, 5 Drawing Sheets

(51) Int. Cl.
*H04L 9/08* (2006.01)
*H04W 88/02* (2009.01)

(52) U.S. Cl.
CPC ......... *H04W 12/041* (2021.01); *H04W 12/63* (2021.01); *H04L 2209/80* (2013.01); *H04W 88/02* (2013.01)

(56) References Cited

OTHER PUBLICATIONS

Apple, "TA change during Authentication procedure in EMM-CONNECTED mode", C1-202263, 3GPP TSG-CT WG1 Meeting #123-e. Electronic meeting, Change Request 24.301 CR 3347 current version 16.4.0, Apr. 16-24, 2020, 8 pages.

Apple, "TA change during Authentication procedure in 5GMM-CONNECTED mode", C1-205051, 3GPP TSG-CT WG1 Meeting #125-e, Electronic Meeting, Change Request 24.501 CR 2092, current version 16.4.1, Aug. 20-28, 2020, 9 pages.

Ericsson, Intel, "5G MM—primary authentication using EPS", C1-173578, 3GPP TSG-CT WG1 Meeting #105, Krakow (Portland), Agenda Item 15.2.1.3, Aug. 21-25, 2017, 11 pages.

Ericsson, "Addition of integrity protection to GMM", C1-162795, 3GPP TSG-CT WG1 Meeting #98, Osaka (Japan), Change Request 24.008, Current version 13.5.0, May 23-27, 2016, 33 pages.

Nokia, Nokia Shanghai Bell,, Verizon, "Abnormal case handling when authentication is not accepted", C1-192695, 3GPP TSG-CT WG Meeting #116, Xi'an, People's Republic of China, Change Request 24.301 current version 16.0.0 (was C1-192305), Apr. 8-12, 2019, 8 pages.

\* cited by examiner

TRACKING AREA IDENTIFIER (TAI) CHANGE DURING AUTHENTICATION REQUEST PROCESSING

TECHNICAL FIELD

This application relates generally to wireless communication systems, and more specifically to properly processing an Authentication Request at a user equipment (UE) responsive to a Tracking Area Identifier (TAI) change at the UE.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mm-Wave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
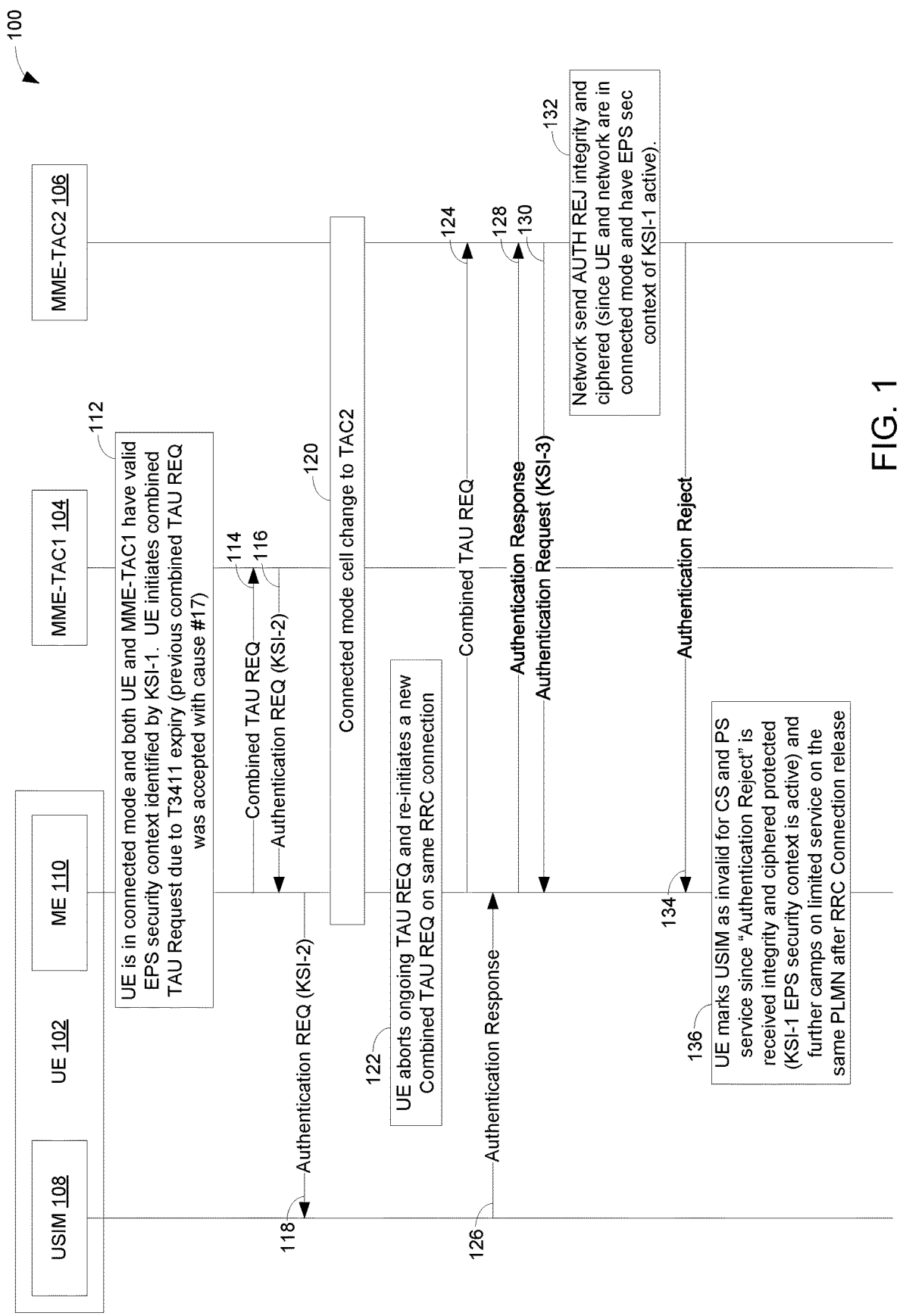
FIG. 1 illustrates a flow diagram of messaging corresponding to race conditions, according to some embodiments.

In some network implementations using UEs being monitored in Tracking Areas (TAs), a Tracking Area Identifier (TAI) change at a UE (e.g., in response to a UE moving from one TA to another TA) may occur during a period when an Authentication Request from a mobility management node of the network is being processed by UE. Examples of a mobility management node may include, for example, a Mobility Management Entity (MME) of a 4G LTE network, an Access and Mobility Management Function (AMF) of a 5G network, a combined UTRAN (comprising a Radio Network Controller (RNC)+NodeB) and Serving GPRS Support Node (SGSN) for Packet Switch (PS) domain and Mobile Switching Center (MSC) for Circuit Switch (CS) domain for a 3G network, and a combined GERAN (comprising a Base Transceiver Station (BTS) and a Base Station Subsystem (BSC)) and SGSN for PS domain and MSC for CS domain in a 2G network.

This (or another) Authentication Request may have been triggered due to, for example, a Tracking Area Update (TAU) Request (e.g., in 4G LTE), a Routing Area Update (RAU) Request (e.g., in 2G, 3G) and/or a Registration Request (e.g., in 5G) (among other examples). Such messages (triggering Authentication Requests the manner described) may be referred to herein as "triggering requests."

It may be that some systems/network implementations, a UE may be configured to send an Authentication Response every time the UE receives a Authentication Request message from a mobility management node of the network. However, there are scenarios (e.g., scenarios also involving a TAI change at the UE) where this requirement can cause the UE and the network to go out of sync, resulting in that the UE is transitioned to a limited service mode. In some systems, it may be that the only way to transition the UE out of the limited service mode is by power cycling the UE (or, alternatively, to wait for a certain duration of time). This may be an undesired result in that it may impact the mobility one or more (up to all) users of UEs of these systems, creating a perception of a "bad" user experience generally.

One scenario causing this situation in the 4G LTE case (which uses TAU requests to a mobility management node that is an MME) is described below:

A UE may be camped on a first TA, TA1
 The UE may send first TAU Request (e.g., a Combined TAU Request) while in connected mode with an MME of TA1
 A TAU Accept message with cause #17 is received at the UE in response to the first TAU Request, which may have indicated the failure of the first TAU Request
 A T3411 timer is started in response to the failure of the first TAU Request The T3411 timer expires, and in response the UE sends a second TAU Request while in connected mode with the MME of TA1

Finally, a first Authentication Request is received at a Mobile Equipment (ME) of the UE from the MME of TA1

The ME forwards the Authentication Request to a Universal Subscriber Identity Module (USIM) of the UE The UE then performs a cell change and enters connected mode on a second TA, TA2

The UE aborts the ongoing TAU request (of TA1) and sends a third (new) TAU request while in connected mode with an MME of TA2

The ME of the UE receives an Authentication Response from the USIM corresponding to the first Authentication Request received from the MME of TA1 and sends this Authentication Response message to network.

In some cases, prior to the receipt of the Authentication Response, a second Authentication Request may be generated by the MME of TA2 (perhaps with different authentication vector parameters (e.g., random number (RAND) and/or authentication token (AUTN) parameters) from the first Authentication Request). In some embodiments, the Authentication Request may also be sent to the UE. In these cases, the MME of TA2 may send an Authentication Reject message in response to the reception at the network of the Authentication Response message corresponding to the first Authentication Request. This may be because the MME of TA2 assumes that the Authentication Response message from the UE (which corresponds to the first Authentication Request) was supposed to be an Authentication Response for the Authentication Request corresponding to TA2 as prepared by the MME of TA2.

In other cases, the Authentication Response may be received prior to the generation of any Authentication Request for the UE by the MME of TA2. In these cases, the receipt of the Authentication Response may also cause the MME of TA2 to send the Authentication Reject message, because in this case the MME of TA2 was not expecting an Authentication Response from the UE.

In either case, the UE may remain camped on limited service (due to the Authentication Reject message) until a power cycle is performed. Note that the Authentication Reject message may be properly received at the UE despite the change from TA1 to TA2, since this change may not invalidate a valid ciphering and/or integrity protection processes that was previously established between the UE and the network. Either of these cases may be referred to herein as a "race condition."

Scenarios implicating these concerns may include:

Scenario A

A UE in connected mode initiates a TAU Request due to change of:

When the UE changes the UE network capability information or the MS network capability information or both;

When the UE changes the UE specific Discontinuous Reception (DRX) parameter;

When the UE's usage setting or the voice domain preference for E-UTRAN change in the UE When the UE changes the UE specific DRX parameter;

When the UE changes the radio capability for GERAN, or cdma2000® or both;

When the UE's usage setting or the voice domain preference for E-UTRAN change in the UE;

When the UE needs to request the use of extended DRX (eDRX) or needs to stop the use of eDRX;

When a change in the eDRX usage conditions at the UE requires different extended DRX parameters;

When T3411 expires

Other potential triggers are contemplated.

The UE may be in connected mode, and one of the above triggers causes UE to initiate a TAU procedure. During this TAU procedure there is a connected mode TAI change. The new TAI that UE detects in connected mode may not be in the registered TAI list. The UE may abort the ongoing TAU Request procedure, then send a new TAU Request integrity and ciphered protected (as it is in connected mode with integrity and ciphering active already) and waits for an Authentication Response from the USIM. In the meantime, the USIM sends the UE an Authentication Response message corresponding to the original TAU procedure. As soon as the Authentication Response (corresponding to the original TAU procedure) is received from USIM, the UE sends the Authentication Response to an MME. The MME determines that this Authentication Response message is incorrect and/or unexpected and sends an Authentication Reject message integrity+ciphered which is successfully decoded and processed by the UE. Accordingly, the UE may camp in limited service until it is power cycled.

Scenario B

A Normal TAU procedure (where a Normal TAU procedure is different from a combined TAU procedure, in that a Combined TAU procedure means both Circuit Switched (CS) and Evolved Packed System (EPS) domain registration is attempted, where as in Normal TAU, only EPS registration is attempted) is triggered by UE due to the above triggers mentioned in Scenario A. In this scenario, Normal TAU handling is similarly applicable to all the above scenarios as applicable for combined TAU.

Scenario C

Scenario C is a 5G scenario in CONNECTED mode. A UE in 5G NR triggers a Registration Request with type "mobility and periodic registration" in CONNECTED mode. Triggers for the Registration Request in this case may be any of the following:

T3511 expiry;

When the UE changes the 5GS Mobility Management (5GMM) capability or the S1 UE network capability (or both);

When the UE's usage setting changes;

When the UE needs to change the slice(s) it is currently registered to;

When the UE changes the UE specific DRX parameters;

When the UE needs to register for Short Message Service (SMS) over Non-Access-Stratum (NAS), indicate a change in the requirements to use SMS over NAS, or de-register from SMS over NAS;

When the UE needs to indicate Protocol Data Unit (PDU) session status to the network after performing a local release of PDU session(s) as specified in 3GPP 24.501 section 6.4.1.5 and 6.4.3.5;

When the UE needs to request new Local Area Data Network (LADN) information;

When the UE needs to request the use of eDRX, when a change in the eDRX usage conditions at the UE requires different eDRX parameters, or needs to stop the use of eDRX;

Other potential triggers are contemplated.

A Registration Request procedure may be ongoing, and the UE moves into connected mode for sending the Registration Request to the network. Ciphering and Integrity protection is not yet active, and the network sends an Authentication Request to the UE. The UE camps on a TAI which is not part of the registration area (e.g., which is not registered a TAI list in LTE or a registered area in 5G). The UE may abort the ongoing Registration Request procedure, while there is a pending Authentication Request response from the USIM. The UE triggers a new Registration Request towards the AMF on the same RRC connection. Soon afterward, the Authentication Response corresponding to the original Registration Request is received from the USIM, the UE sends this Authentication Response to the network. The network determines that this Authentication Response is incorrect and/or unexpected and sends an Authentication Reject message (which may be integrity protected, causing UE to consider the Authentication Reject message as valid), causing the UE to be placed in limited service. If the Authentication Reject message is sent with without integrity protection, then UE may bar the camped TA for 30-60 mins and have no service for this duration.

In another aspect: when the Registration Request procedure is ongoing and the UE is in connected mode, and ciphering and integrity is active, the UE camps on a TAI which is not part of the registration area (e.g., which is not registered a TAI list in LTE or a registered area in 5G). The UE then aborts the ongoing Registration Request procedure while there is a pending Authentication Request response from USIM. The UE triggers a new Registration Request message towards the AMF. Soon afterward, the Authentication Response (corresponding to the original Registration Request procedure) is received from USIM and the UE sends this Authentication Response to the network. The AMF determines that this Authentication Response message is incorrect and/or unexpected, and sends an Authentication Reject message (integrity and ciphered protected) which is successfully decoded and processed by the UE. In response, the UE may camp in limited service until it is power cycled.

Scenario D

Scenario D is a 5G Scenario. The UE is in connected mode with integrity and ciphering active and the network triggers an Authentication Request procedure (the network can trigger the Authentication Request procedure at any time when UE is in connected mode). The UE then detects a change in camped TAI (which is not part of the registration area) while an Authentication Response message from the USIM is awaited. The UE immediately triggers a Registration Request with type "mobility and periodic registration." The Authentication Response corresponding to the original Authentication Request procedure message is then received at the UE from the USIM and is sent to the AMF on the new TAI just as the AMF triggers a new Authentication Request procedure on the new TAI. Once this Authentication Response message is received at the AMF, the AMF determines that it is incorrect and/or unexpected and sends an Authentication Reject message integrity and ciphered protected which is successfully decoded and processed by the UE. In response, the UE may camp in limited service until it is power cycled.

Scenario E

Scenario E is a 4G Scenario. The UE may be in connected mode with integrity and ciphering active, and the network triggers an Authentication Request procedure (the network can trigger an Authentication Request procedure at any time when UE is in connected mode). The UE then detects a change in camped TAI (which is not part of the registration TAI list) while an Authentication Response Message from the USIM is awaited. The UE immediately triggers a TAU Request message. The Authentication Response message corresponding to the original Authentication Request procedure is then received from the USIM is sent to the MME on the new TAI just as the MME triggers a new Authentication Request message on the new TAI. Once this Authentication Response message is received at the MME, the MME determines that it is incorrect and/or unexpected and sends an Authentication Reject message integrity and ciphered protected which is successfully decoded and processed by the UE. In response, the UE may camp in limited service until it is power cycled.

Scenario F

Analogous issues to those discussed above can happen in 2G & 3G as well. In these cases UE will initiate a Routing Area Request procedure and/or a Location Updating Request procedure, with analogous race scenarios being caused thereby.

It is contemplated that the above scenarios may occur even in cases where the mobility management node of TA1 and the mobility management node of TA2 are the same mobility management node.

In systems described above, there are multiple implementations possible at both the UE and the network side to handle the scenarios described above which may result in erroneous handling in UE:

1. The network may retransmit the same Authentication Request from the mobility management node of TA1 as was sent from the mobility management node of TA2
2. The network can send a new Authentication Request from the mobility management node of TA1
3. The UE may incorrectly send an Authentication Response for the Authentication Request from the mobility management node of TA1 according to TA1 instead of for the Authentication Request from the mobility management node of TA2 according to TA2.

FIG. 1 illustrates a flow diagram 100 of messaging corresponding to race conditions, according to some embodiments. A system as described herein may include a UE 102, an MME-TAC1 104 (which may be an MME of a first TA, TA1, using a first Tracking Area Code (TAC), TAC1), and an MME-TAC2 106 (which may be an MME of a second TA, TA2, using a second TAC, TAC2). The UE 102 may include a USIM 108 and a ME 110.

In block 112, the ME 110 of the UE 102 is in connected mode with the MME-TAC1 104, and both the UE 102 and the MME-TAC1 104 have a valid EPS security context identified by a first Key Set Identifier (KSI), KSI-1. The UE 102 may initiate a first Combined TAU Request. This may be due to, for example, a T3411 expiration in a case where a previous Combined TAU Request was accepted with cause #17.

The ME 110 of the UE 102 may then send this first Combined TAU request in the Combined TAU Request message 114 to the MME-TAC1 104. The MME-TAC1 104 may send, in response, an Authentication Request message 116 corresponding to the Combined TAU Request message 114. The Authentication Request message 116 may be according to a second KSI, KSI-2. The Authentication Request message 116 may be received at the ME 110 of the UE 102.

The ME 110 may then forward the Authentication Request message 116 message as the Authentication Request message 118 to the USIM 108.

In block 120, the ME 110 of the UE 102 makes a connected mode cell change to an new TA corresponding to TAC2 and the MME-TAC2 106.

In block 122, the UE aborts the ongoing Combined TAU Request and re-initiates a new Combined TAU Request with the MME-TAC2 106. This may be using the same Radio Resource Control (RRC) connection as was used previously.

The ME 110 of the UE 102 may then send this new Combined TAU Request in the Combined TAU Request message 124 to the MME-TAC2 106.

The USIM 108 may then send the Authentication Response message 126 to the ME 110. This Authentication Response message 126 may correspond to the Authentication Request message 118 that was forwarded from the MME-TAC1 104 to the USIM 108 by the ME 110. It may be that the UE 102 did not abort the sending of this Authentication Response message 126 in response to the connected mode cell change to TAC2 of block 120.

After the Authentication Response message 126 is sent, the UE may return to the TAC2 coverage area, and may camp in the TA corresponding to the TAC2 without a periodic timer expiry.

The ME 110 may then forward the Authentication Response message 126 message to the MME-TAC2 106 as the Authentication Response message 128.

At or near this time period, the MME-TAC2 106 may have also prepared the Authentication Request message 130. The Authentication Request message 130 may be according to a third KSI, KSI-3.

Here, multiple problematic scenarios are possible. A first is that the Authentication Response message 128 arrives at the MME-TAC2 106 prior to the preparation of the Authentication Request message 130 by the MME-TAC2 106. In this case, the receipt of the Authentication Response message 128 may cause the MME-TAC2 106 to send the Authentication Reject message 134, because in this case the MME-TAC2 106 was not expecting the Authentication Response message 128 from the UE.

A second of the problematic scenarios is that the Authentication Request message 130 may have been generated (an perhaps, but not necessarily, sent) by the MME-TAC2 106 prior to the receipt of the Authentication Response message 128. In these cases, it is possible that the Authentication Request message 130 was generated with different RAND and/or AUTN parameters than the Authentication Request message 116. In this case, the MME-TAC2 106 may send the Authentication Reject message 134 in response to the receipt of the Authentication Response message 128, because the MME-TAC2 106 assumes that the Authentication Response message 128 was supposed to be in response to the Authentication Request message 130 (but it clearly is not because of the mismatch between the RAND and/or the AUTN parameters between the Authentication Response message 128 and the Authentication Request message 130).

In either case, the MME-TAC2 106 prepares in block 132 an Authentication Reject message. This message may be properly configured to be accepted at the ME 110 of the 102 because the change from TA1 to TA2 may not have invalidated a valid ciphering and/or integrity protection process previously established between the UE and the network).

The MME-TAC2 106 may then send the Authentication Reject message 134 to the ME 110 of the UE 102. In response, the UE 102, in block 136, may mark the USIM 108 as invalid for Circuit Switched (CS) and Packet Switched (PS) service since the Authentication Reject message 134 is received integrity and ciphered protected in the expected manner. The UE 102 may further camp on limited service on the same Public Land Mobile Network (PLMN) after an RRC Connection release. The UE 102 may remain in this state of reduced utility until the UE 102 is power cycled.

The race conditions identified above may be solved by the following: During an authentication procedure (e.g., one of the procedures discussed previously) if a TAI change occurs that will result in a new triggering request to be sent corresponding to a new TA, then the UE may not send a Authentication Response message corresponding to an Authentication Request of the original authentication procedure to the mobility management node of the new TA (e.g., it may abort the sending of such a message). Instead, the UE may compute this Authentication Response message and store it in memory. The UE may then, after aborting the previous authentication procedure, reinitiate the new authentication procedure with the mobility management node of TA2 and wait for a new Authentication Request message from the network (e.g., from the mobility management node of TA2 according to TA2).

At this stage, if UE receives again the same Authentication Request message (e.g., an Authentication Request message having the same RAND parameter as the first Authentication Request message corresponding to the original authentication procedure), then UE may not send the new Authentication Request message to a USIM for processing, but rather may reply back with the Authentication Response message that is stored in memory.

Figure 2:
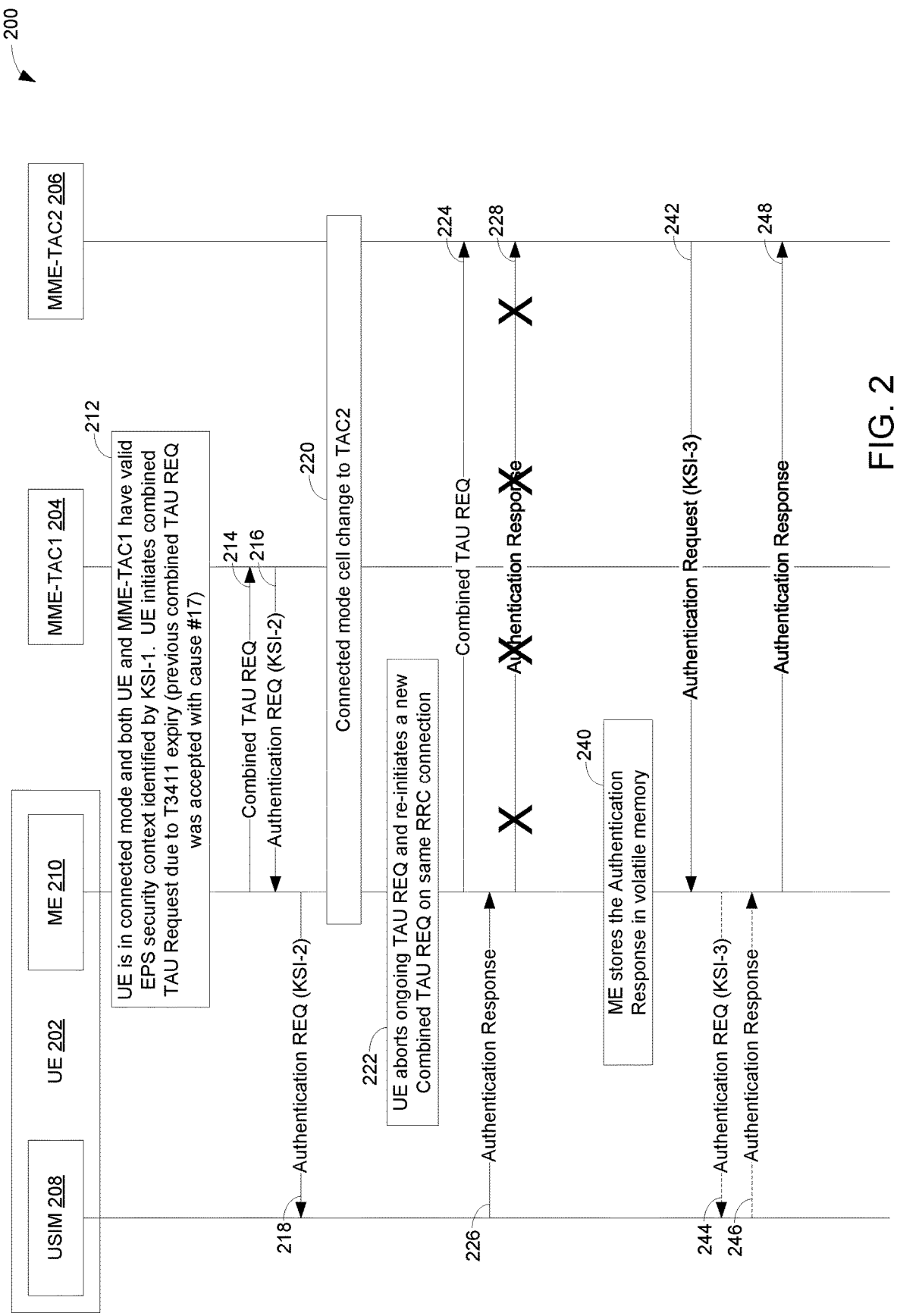
FIG. 2 illustrates a flow diagram of messaging corresponding to a solution to potential race conditions

FIG. 2 illustrates a flow diagram 200 of messaging corresponding to a solution to potential race conditions, according to some embodiments. Elements 102-228 may be analogous to similarly numbered elements found in FIG. 1.

One difference may be that the UE 202 has been configured to abort a sending of the Authentication Response message 228 in response to the connected mode cell change to TAC2, corresponding to the MME-TAC2 206 of block 220. Accordingly, it may be that the ME 210 is configured to abort the sending of the Authentication Response message 228 corresponding to the Authentication Response message 226 received form the USIM 208 (e.g., it does not send the Authentication Response message 228 message to the MME-TAC2 206). Further, the ME 210 at block 240 may store the Authentication Response message 226 in volatile memory.

The ME 210 may then receive an Authentication Request message 242 corresponding to the Combined TAU Request message 224. The ME 210 may determine whether the Authentication Request message 242 is the same as the Authentication Request message 216. This may be done by checking the RAND parameters of the Authentication Request message 216 and the Authentication Request message 242 to see whether they are the same.

If they are not the same, the ME 110 may forward the Authentication Request message 242 to the USIM 208. The USIM 208 may then generate a corresponding Authentication Response message 246 send the Authentication Response message 246 to the ME 210. The ME 210 may then forward the Authentication Response message 246 to the MME-TAC2 206 as the Authentication Response message 248.

Alternatively, if the RAND values are the same, the ME 210 may instead bypass forwarding the Authentication Request message 244 to the USIM 208 and pull the Authentication Response message 226 from the volatile memory (which was stored in block 240 as described above). In this case, it may be that in this case, the Authentication Response message 226 stored in the volatile memory is a good response to the Authentication Request message 242 from the MME-TAC2 206. Accordingly, the ME 210 may forward the Authentication Response message 226 as the Authentication Response message 248.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 3:
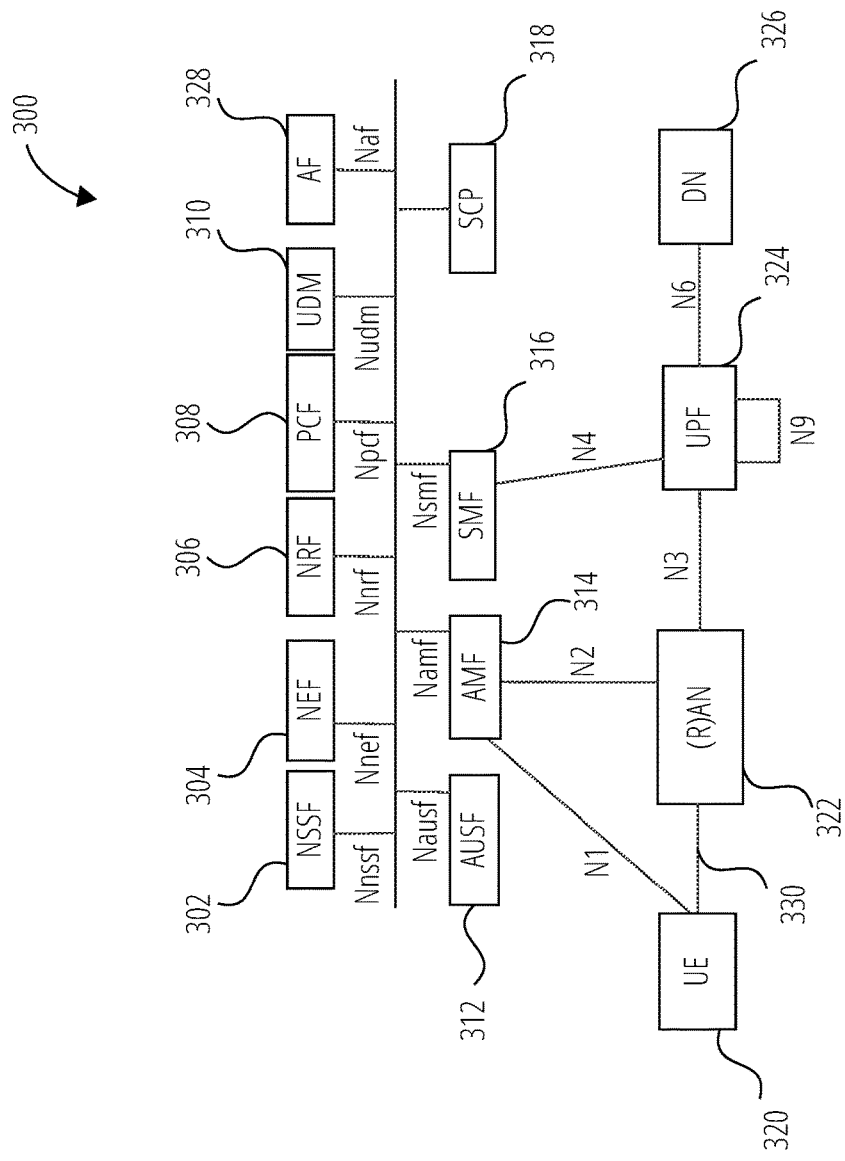
FIG. 3 illustrates an example service based architecture in accordance with certain embodiments.

FIG. 3 illustrates a service based architecture 300 in 5GS according to one embodiment. As described in 3GPP TS 23.501, the service based architecture 300 comprises NFs such as an NSSF 302, a NEF 304, an NRF 306, a PCF 308, a UDM 310, an AUSF 312, an AMF 314, an SMF 316, for communication with a UE 320, a (R)AN 322, a UPF 324, and a DN 326. The NFs and NF services can communicate directly, referred to as Direct Communication, or indirectly via a SCP 318, referred to as Indirect Communication. FIG. 3 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 3 are described below.

The NSSF 302 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 304 supports exposure of capabilities and events. NF capabilities and events may be securely exposed by the NEF 304 (e.g., for 3rd party, Application Functions, and/or Edge Computing). The NEF 304 may store/retrieve information as structured data using a standardized interface (Nudr) to a UDR. The NEF 304 may also secure provision of information from an external application to 3GPP network and may provide for the Application Functions to securely provide information to the 3GPP network (e.g., expected UE behavior, 5GLAN group information, and service specific information), wherein the NEF 304 may authenticate and authorize and assist in throttling the Application Functions. The NEF 304 may provide translation of internal-external information by translating between information exchanged with the AF and information exchanged with the internal network function. For example, the NEF 304 translates between an AF-Service-Identifier and internal 5G Core information such as DNN and S-NSSAI. The NEF 304 may handle masking of network and user sensitive information to external AF's according to the network policy. The NEF 304 may receive information from other network functions (based on exposed capabilities of other network functions), and stores the received information as structured data using a standardized interface to a UDR. The stored information can be accessed and re-exposed by the NEF 304 to other network functions and Application Functions, and used for other purposes such as analytics. For external exposure of services related to specific UE(s), the NEF 304 may reside in the HPLMN. Depending on operator agreements, the NEF 304 in the HPLMN may have interface(s) with NF(s) in the VPLMN. When a UE is capable of switching between EPC and 5GC, an SCEF+NEF may be used for service exposure.

The NRF 306 supports service discovery function by receiving an NF Discovery Request from an NF instance or SCP and providing the information of the discovered NF instances to the NF instance or SCP. The NRF 306 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 308 supports a unified policy framework to govern network behavior. The PCF 308 provides policy rules to Control Plane function(s) to enforce them. The PCF 308 accesses subscription information relevant for policy decisions in a Unified Data Repository (UDR). The PCF 308 may access the UDR located in the same PLMN as the PCF.

The UDM 310 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 310 uses subscription data (including authentication data) that may be stored in a UDR, in which case a UDM implements the application logic and may not require an internal user data storage and several different UDMs may serve the same user in different transactions. The UDM 310 may be located in the HPLMN of the subscribers it serves, and may access the information of the UDR located in the same PLMN.

The AF 328 interacts with the Core Network to provide services that, for example, support the following: application influence on traffic routing; accessing the NEF 304; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 304 to interact with relevant Network Functions.

The AUSF 312 supports authentication for 3GPP access and untrusted non-3GPP access. The AUSF 312 may also provide support for Network Slice-Specific Authentication and Authorization.

The AMF 314 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 314. Regardless of the number of Network functions, in certain embodiments there is only one NAS interface instance per access network between the UE and the CN, terminated at one of the Network functions that implements at least NAS security and Mobility Management. The AMF 314 may also include policy related functionalities.

In addition to the functionalities described above, the AMF 314 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 316 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 316 may include policy related functionalities.

The SCP 318 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 318 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 320 may include a device with radio communication capabilities. For example, the UE 320 may comprise a smartphone (e.g., handheld touchscreen mobile computing devices connectable to one or more cellular networks). The UE 320 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 320 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 320 may be configured to connect or communicatively couple with the (R)AN 322 through a radio interface 330, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 320 and the (R)AN 322 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 322 to the UE 320 and a UL transmission may be from the UE 320 to the (R)AN 322. The UE 320 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 322 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 322 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 322) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 320 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 324 may act as an anchor point for intra-RAT and inter-RAT mobility, an external PDU session point of interconnect to the DN 326, and a branching point to support multi-homed PDU session. The UPF 324 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 324 may include an uplink classifier to support routing traffic flows to a data network. The DN 326 may represent various network operator services, Internet access, or third party services. The DN 326 may include, for example, an application server.

Figure 4:
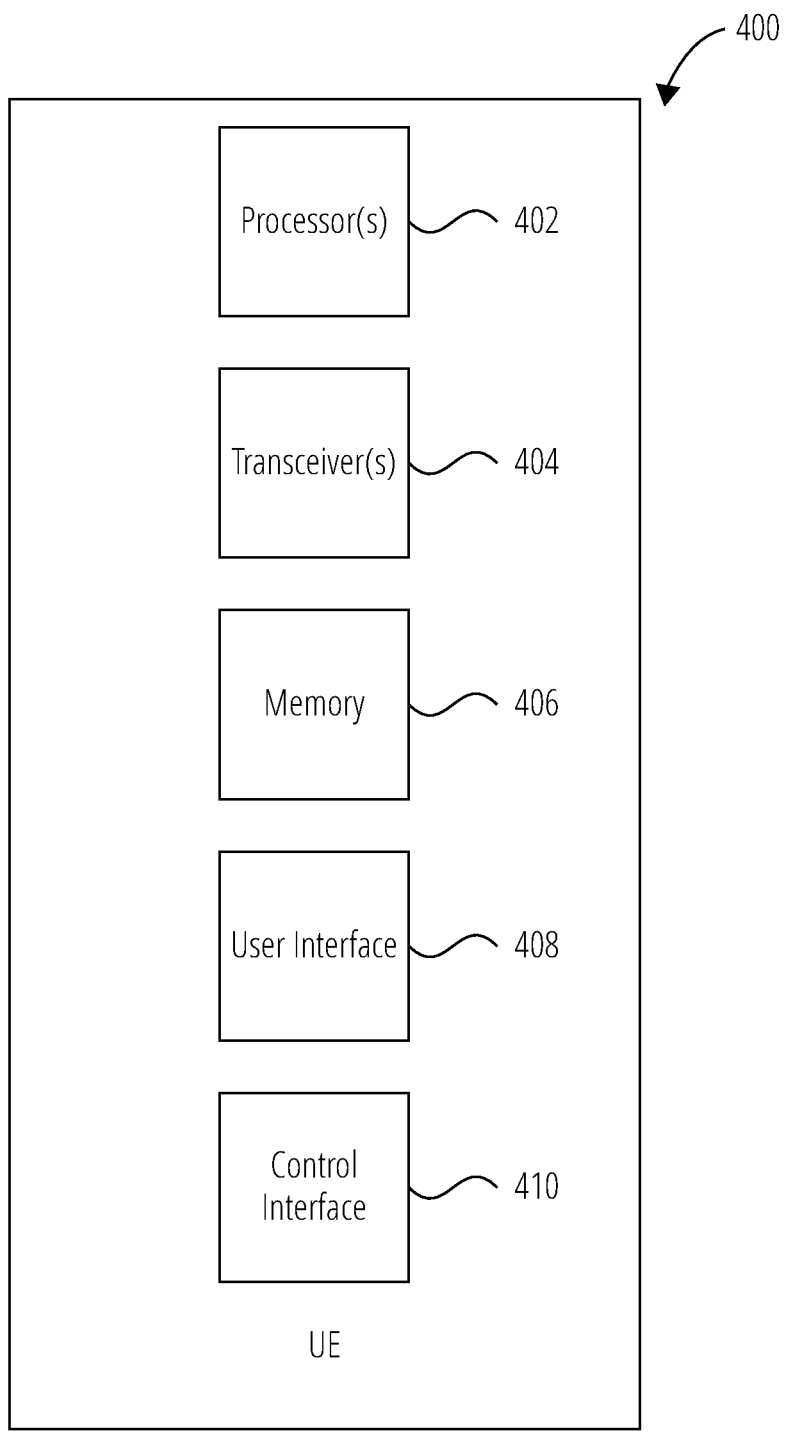
FIG. 4 illustrates a UE in accordance with one embodiment.

FIG. 4 is a block diagram of an example UE 400 configurable according to various embodiments of the present disclosure, including by execution of instructions on a computer-readable medium that correspond to any of the example methods and/or procedures described herein. The UE 400 comprises one or more processor 402, transceiver 404, memory 406, user interface 408, and control interface 410.

The one or more processor 402 may include, for example, an application processor, an audio digital signal processor, a central processing unit, and/or one or more baseband processors. Each of the one or more processor 402 may include internal memory and/or may include interface(s) to communication with external memory (including the memory 406). The internal or external memory can store software code, programs, and/or instructions for execution by the one or more processor 402 to configure and/or facilitate the UE 400 to perform various operations, including operations described herein. For example, execution of the instructions can configure the UE 400 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 404, user interface 408, and/or control interface 410. As another example, the one or more processor 402 may execute program code stored in the memory 406 or other memory that corresponds to MAC, RLC, PDCP, and RRC layer protocols standardized by 3GPP (e.g., for NR and/or LTE). As a further example, the processor 402 may execute program code stored in the memory 406 or other memory that, together with the one or more transceiver 404, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 406 may comprise memory area for the one or more processor 402 to store variables used in protocols, configuration, control, and other functions of the UE 400, including operations corresponding to, or comprising, any of the example methods and/or procedures described herein. Moreover, the memory 406 may comprise non-volatile memory (e.g., flash memory), volatile memory (e.g., static or dynamic RAM), or a combination thereof. Furthermore, the memory 406 may interface with a memory slot by which removable memory cards in one or more formats (e.g., SD Card, Memory Stick, Compact Flash, etc.) can be inserted and removed.

The one or more transceiver 404 may include radio-frequency transmitter and/or receiver circuitry that facilitates the UE 400 to communicate with other equipment supporting like wireless communication standards and/or protocols. For example, the one or more transceiver 404 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 402. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 404 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 402 to implement a PHY layer based on OFDM, OFDMA, and/or SC-FDMA technologies, such as described herein with respect to other figures.

The user interface 408 may take various forms depending on particular embodiments, or can be absent from the UE 400. In some embodiments, the user interface 408 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 400 may comprise a tablet computing device including a larger touchscreen display. In such embodiments, one or more of the mechanical features of the user interface 408 may be replaced by comparable or functionally equivalent virtual user interface features (e.g., virtual keypad, virtual buttons, etc.) implemented using the touchscreen display, as familiar to persons of ordinary skill in the art. In other embodiments, the UE 400 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 400 having a touch screen display are capable of receiving user inputs, such as inputs related to exemplary methods and/or procedures described herein or otherwise known to persons of ordinary skill in the art.

In some exemplary embodiments of the present disclosure, the UE 400 may include an orientation sensor, which can be used in various ways by features and functions of the UE 400. For example, the UE 400 can use outputs of the orientation sensor to determine when a user has changed the physical orientation of the UE 400's touch screen display. An indication signal from the orientation sensor can be available to any application program executing on the UE 400, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 410 may take various forms depending on particular embodiments. For example, the control interface 410 may include an RS-232 interface, an RS-485 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1260 can comprise an IEEE 802.3 Ethernet interface such as described above. In some embodiments of the present disclosure, the control interface 410 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 400 may include more functionality than is shown in FIG. 4 including, for example, a video and/or still-image camera, microphone, media player and/or recorder, etc. Moreover, the one or more transceiver 404 may include circuitry for communication using additional radio-frequency communication standards including Bluetooth, GPS, and/or others. Moreover, the one or more processor 402 may execute software code stored in the memory 406 to control such additional functionality. For example, directional velocity and/or position estimates output from a GPS receiver can be available to any application program executing on the UE 400, including various exemplary methods and/or computer-readable media according to various exemplary embodiments of the present disclosure.

Figure 5:
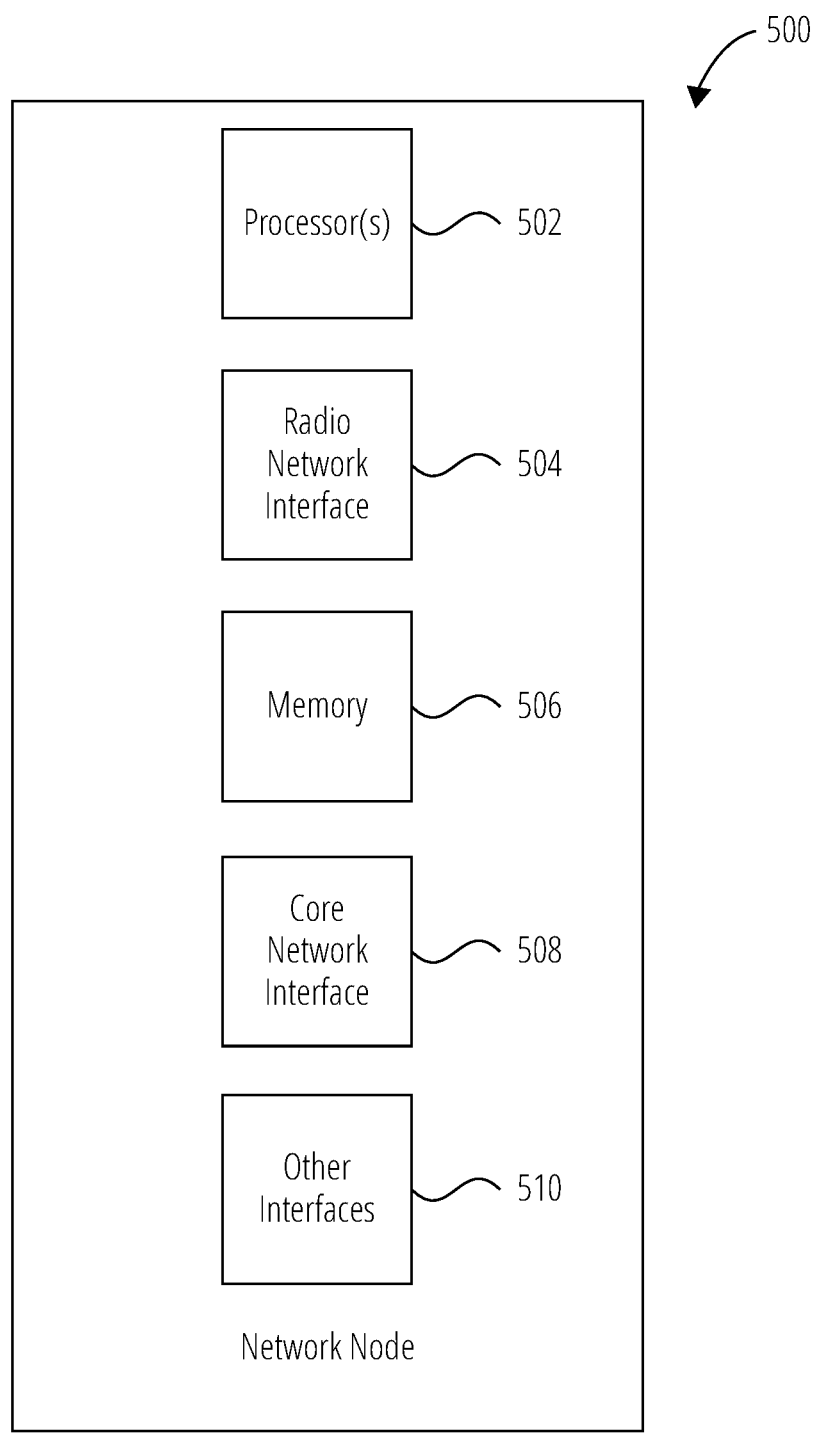
FIG. 5 illustrates a network node in accordance with one embodiment.

FIG. 5 is a block diagram of an example network node 500 configurable according to various embodiments of the present disclosure, including by execution of instructions on a computer-readable medium that correspond to any of the example methods and/or procedures described herein.

The network node 500 includes a one or more processor 502, a radio network interface 504, a memory 506, a core network interface 508, and other interfaces 510. The network node 500 may comprise, for example, a base station, eNB, gNB, access node, or component thereof.

The one or more processor 502 may include any type of processor or processing circuitry and may be configured to perform an of the methods or procedures disclosed herein. The memory 506 may store software code, programs, and/or instructions executed by the one or more processor 502 to configure the network node 500 to perform various operations, including operations described herein. For example, execution of such stored instructions can configure the network node 500 to communicate with one or more other devices using protocols according to various embodiments of the present disclosure, including one or more methods and/or procedures discussed above. Furthermore, execution of such stored instructions can also configure and/or facilitate the network node 500 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 504 and the core network interface 508. By way of example and without limitation, the core network interface 508 comprise an S1 interface and the radio network interface 504 may comprise a Uu interface, as standardized by 3GPP. The memory 506 may also store variables used in protocols, configuration, control, and other functions of the network node 500. As such, the memory 506 may comprise non-volatile memory (e.g., flash memory, hard disk, etc.), volatile memory (e.g., static or dynamic RAM), network-based (e.g., "cloud") storage, or a combination thereof.

The radio network interface 504 may include transmitters, receivers, signal processors, ASICs, antennas, beamforming units, and other circuitry that enables network node 500 to communicate with other equipment such as, in some embodiments, a plurality of compatible user equipment (UE). In some embodiments, the network node 500 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 504 may include a PHY layer based on OFDM, OFDMA, and/or SC-FDMA technologies. In some embodiments, the functionality of such a PHY layer can be provided cooperatively by the radio network interface 504 and the one or more processor 502.

The core network interface 508 may include transmitters, receivers, and other circuitry that enables the network node 500 to communicate with other equipment in a core network such as, in some embodiments, circuit-switched (CS) and/or packet-switched Core (PS) networks. In some embodiments, the core network interface 508 may include the S1 interface standardized by 3GPP. In some embodiments, the core network interface 508 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 508 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 510 may include transmitters, receivers, and other circuitry that enables the network node 500 to communicate with external networks, computers, databases, and the like for purposes of operations, administration, and maintenance of the network node 500 or other network equipment operably connected thereto.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method of a user equipment (UE), comprising: receiving a first authentication request in response to a first triggering request from the UE to a mobility management node of a first Tracking Area (TA) in which the UE is located; preparing and storing an authentication response according to the first authentication request; in response to determining that the UE has moved from the first TA to a second TA: aborting a sending of the authentication response; aborting the first triggering request; sending a second triggering request from the UE to a mobility management node of the second TA; receiving, from the mobility management node of the second TA; a second authentication request in response to the second triggering request; and sending the stored authentication response according to the first authentication request to the mobility management node of the second TA in response to the receipt of the second authentication request and in further response to a determination that a given parameter of each of the first and second authentication requests are the same.

Example 2 is the method of Example 1, wherein the given parameter is a RAND parameter.

Example 3 is the method of any of Examples 1-2, wherein the first authentication request and the second authentication request are received according to different Key Set Identifiers (KSIs).

Example 4 is the method of any of Examples 1-3, wherein the mobility management node of the first TA and the mobility management node of the second TA are the same mobility management node.

Example 5 is a method of a user equipment (UE), comprising: receiving a first authentication request in response to a first triggering request from the UE to a mobility management node of a first Tracking Area (TA) in which the UE is located; in response to determining that the UE has moved from the first TA to a second TA: aborting a sending of a first authentication response; aborting the first triggering request; sending a second triggering request from the UE to a mobility management node of the second TA; receiving, from the mobility management node of the second TA, a second authentication request in response to the second triggering request; and sending a second authentication response according to the second authentication request to the mobility management node of the second TA in response to the receipt of the second authentication request.

Example 6 is the method of Example 5, wherein the second authentication response is sent in further response to a determination that a given parameter of each of the first and second authentication requests are different.

Example 7 is the method of any of Examples 5-6, wherein the first authentication request and the second authentication request are received according to different Key Set Identifiers (KSIs).

Example 8 is the method of any of Examples 5-7, wherein the mobility management node of the first TA and the mobility management node of the second TA are the same mobility management node.

Example 9 is a computing apparatus of a user equipment (UE), the computing apparatus comprising a processor and memory storing instructions. The processor and the memory storing instructions that, when executed by the processor, configure the computing apparatus to: process a first authentication request received at the UE in response to a first triggering request from the UE to a mobility management node of a first Tracking Area (TA) in which the UE is located; prepare and store an authentication response according to the first authentication request; in response to determining that the UE has moved from the first TA to a second TA: abort a sending of the authentication response; abort the first triggering request; prepare a second triggering request to be sent from the UE to a mobility management node of the second TA; process a second authentication request received at the UE from the mobility management node of the second TA in response to the second triggering request; and retrieve the stored authentication response according to the first authentication request, the stored authentication response to be sent by the UE to the mobility management node of the second TA in response to the receipt at the UE of the second authentication request and in further response to a determination that a given parameter of each of the first and second authentication requests are the same.

Example 10 is the computing apparatus of Example 9, wherein the given parameter is a RAND parameter.

Example 11 is the computing apparatus of any of Examples 9-10, wherein the first authentication request and the second authentication request are received according to different Key Set Identifiers (KSIs).

Example 12 is the computing apparatus of any of Examples 9-11, wherein the mobility management node of the first TA and the mobility management node of the second TA are the same mobility management node.

Example 13 is a computing apparatus of a user equipment (UE), the computing apparatus comprising a processor and a memory storing instructions. The processor and the memory storing instructions that, when executed by the processor, configure the computing apparatus to: process a first authentication request received at the UE in response to a first triggering request from the UE to a mobility management node of a first Tracking Area (TA) in which the UE is located; in response to determining that the UE has moved from the first TA to a second TA: abort a sending of a first authentication response; abort the first triggering request; prepare a second triggering request to be sent from the UE to a mobility management node of the second TA; process a second authentication request received at the UE from the mobility management node of the second TA in response to the second triggering request; and prepare a second authentication response according to the second authentication request, the second authentication response to be sent by the UE to the mobility management node of the second TA in response to the receipt of the second authentication request.

Example 14 is the computing apparatus of Example 13, wherein the second authentication response is sent in further response to a determination that a given parameter of each of the first and second authentication requests are different.

Example 15 is the computing apparatus of any of Examples 13-14, wherein the first authentication request and the second authentication request are received according to different Key Set Identifiers (KSIs).

Example 16 is the computing apparatus of any of Examples 13-15, wherein the mobility management node of the first TA and the mobility management node of the second TA are the same mobility management node.

Example 17 is a non-transitory computer-readable storage medium, the computer-readable storage medium including instructions that when executed by a computer, cause the computer to: process a first authentication request received at a UE in response to a first triggering request from the UE to a mobility management node of a first Tracking Area (TA) in which the UE is located; prepare and store an authentication response according to the first authentication request; in response to determining that the UE has moved from the first TA to a second TA: abort a sending of the authentication response; abort the first triggering request; prepare a second triggering request to be sent from the UE to a mobility management node of the second TA; process a second authentication request received at the UE from the mobility management node of the second TA in response to the second triggering request; and retrieve the stored authentication response according to the first authentication request, the stored authentication response to be sent by the UE to the mobility management node of the second TA in response to the receipt at the UE of the second authentication request and in further response to a determination that a given parameter of each of the first and second authentication requests are the same.

Example 18 is the non-transitory computer-readable storage medium of Example 17, wherein the given parameter is a RAND parameter.

Example 19 is the non-transitory computer-readable storage medium of any of Examples 17-18, wherein the first authentication request and the second authentication request are received according to different Key Set Identifiers (KSIs).

Example 20 is the non-transitory computer-readable storage medium of any of Examples 17-19, wherein the mobility management node of the first TA and the mobility management node of the second TA are the same mobility management node.

Example 21 is a non-transitory computer-readable storage medium, the computer-readable storage medium including instructions that when executed by a computer, cause the computer to: process a first authentication request received at a UE in response to a first triggering request from the UE to a mobility management node of a first Tracking Area (TA) in which the UE is located; in response to determining that the UE has moved from the first TA to a second TA: abort a sending of a first authentication response; abort the first triggering request; prepare a second triggering request to be sent from the UE to a mobility management node of the second TA; process a second authentication request received at the UE from the mobility management node of the second TA in response to the second triggering request; and prepare a second authentication response according to the second authentication request, the second authentication response to be sent by the UE to the mobility management node of the second TA in response to the receipt of the second authentication request.

Example 22 is the non-transitory computer-readable storage medium of Example 21, wherein the second authentication response is sent in further response to a determination that a given parameter of each of the first and second authentication requests are different.

Example 23 is the non-transitory computer-readable storage medium of any of Examples 21-22, wherein the first authentication request and the second authentication request are received according to different Key Set Identifiers (KSIs).

Example 24 is the non-transitory computer-readable storage medium of any of Examples 21-23, wherein the mobility management node of the first TA and the mobility management node of the second TA are the same mobility management node.

Example 25 may include an apparatus comprising means to perform one or more elements of a method described in or related to any of the above Examples, or any other method or process described herein.

Example 26 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 27 may include an apparatus comprising logic, modules, or circuitry to perform one or more elements of a method described in or related to any of the above Examples, or any other method or process described herein.

Example 28 may include a method, technique, or process as described in or related to any of the above Examples, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of the above Examples, or portions thereof Example 30 may include a signal as described in or related to any of the above Examples, or portions or parts thereof.

Example 31 may include a datagram, packet, frame, segment, protocol data unit (PDU), or message as described in or related to any of the above Examples, or portions or parts thereof, or otherwise described in the present disclosure.

Example 32 may include a signal encoded with data as described in or related to any of the above Examples, or portions or parts thereof, or otherwise described in the present disclosure.

Example 33 may include a signal encoded with a datagram, packet, frame, segment, PDU, or message as described in or related to any of the above Examples, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 35 may include a computer program comprising instructions, wherein execution of the program by a processing element is to cause the processing element to carry out the method, techniques, or process as described in or related to any of the above Examples, or portions thereof.

Example 36 may include a signal in a wireless network as shown and described herein.

Example 37 may include a method of communicating in a wireless network as shown and described herein.

Example 38 may include a system for providing wireless communication as shown and described herein.

Example 39 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method of a user equipment (UE), comprising:
receiving a first authentication request in response to a first triggering request from the UE to a mobility management node of a first Tracking Area (TA) in which the UE is located;
preparing and storing an authentication response according to the first authentication request;
in response to determining that the UE has moved from the first TA to a second TA:
aborting a sending of the authentication response;
aborting the first triggering request;
sending a second triggering request from the UE to a mobility management node of the second TA;
receiving, from the mobility management node of the second TA, a second authentication request in response to the second triggering request; and
sending the stored authentication response according to the first authentication request to the mobility management node of the second TA in response to the receiving of the second authentication request and in further response to a determination that a given parameter of each of the first and second authentication requests are the same.

2. The method of claim 1, wherein the given parameter is a RAND parameter.

3. The method of claim 1, wherein the first authentication request and the second authentication request are received according to different Key Set Identifiers (KSIs).

4. The method of claim 1, wherein the mobility management node of the first TA and the mobility management node of the second TA are the same mobility management node.

5. A method of a user equipment (UE), comprising:
receiving a first authentication request in response to a first triggering request from the UE to a mobility management node of a first Tracking Area (TA) in which the UE is located;
in response to determining that the UE has moved from the first TA to a second TA:
aborting a sending of a first authentication response;
aborting the first triggering request;
sending a second triggering request from the UE to a mobility management node of the second TA;
receiving, from the mobility management node of the second TA, a second authentication request in response to the second triggering request; and
sending a second authentication response according to the second authentication request to the mobility management node of the second TA in response to the receiving of the second authentication request.

6. The method of claim 5, wherein the second authentication response is sent in further response to a determination that a given parameter of each of the first and second authentication requests are different.

7. The method of claim 5, wherein the first authentication request and the second authentication request are received according to different Key Set Identifiers (KSIs).

8. The method of claim 5, wherein the mobility management node of the first TA and the mobility management node of the second TA are the same mobility management node.

9. A computing apparatus of a user equipment (UE), the computing apparatus comprising:
a processor; and
a memory storing instructions that, when executed by the processor, configure the computing apparatus to:
process a first authentication request received at the UE in response to a first triggering request from the UE to a mobility management node of a first Tracking Area (TA) in which the UE is located;
prepare and store an authentication response according to the first authentication request;
in response to determining that the UE has moved from the first TA to a second TA:
abort a sending of the authentication response;
abort the first triggering request;
prepare a second triggering request to be sent from the UE to a mobility management node of the second TA;
process a second authentication request received at the UE from the mobility management node of the second TA in response to the second triggering request; and
retrieve the stored authentication response according to the first authentication request, the stored authentication response to be sent by the UE to the mobility management node of the second TA in response to the second authentication request and in further response to a determination that a given parameter of each of the first and second authentication requests are the same.

10. The computing apparatus of claim 9, wherein the given parameter is a RAND parameter.

11. The computing apparatus of claim 9, wherein the first authentication request and the second authentication request are received according to different Key Set Identifiers (KSIs).

12. The computing apparatus of claim 9, wherein the mobility management node of the first TA and the mobility management node of the second TA are the same mobility management node.

* * * * *